US008924916B2

(12) United States Patent
Wadhwani et al.

(10) Patent No.: US 8,924,916 B2
(45) Date of Patent: Dec. 30, 2014

(54) SOFTWARE DEVELOPMENT STANDARDS COMPLIANCE SYSTEM

(71) Applicant: Bank of America Corporation, Charlotte, NC (US)

(72) Inventors: Rajat Wadhwani, Closter, NJ (US); Bridget E. O'Connor, Holmdel, NJ (US); Timothy Guerry, Cornelius, NC (US); Kailash Poddar, Coppell, TX (US); Ananthakrishnan Ravi Venkataraman, Irving, TX (US); Melinda A. Irby, Charlotte, NC (US); Susan McClung, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 180 days.

(21) Appl. No.: 13/673,573

(22) Filed: Nov. 9, 2012

(65) Prior Publication Data

US 2014/0137071 A1 May 15, 2014

(51) Int. Cl.
*G06F 9/44* (2006.01)
*G06F 11/36* (2006.01)

(52) U.S. Cl.
CPC ................ *G06F 11/3604* (2013.01)
USPC ....................................... 717/101

(58) Field of Classification Search
CPC .................................. G06F 11/3604
USPC ....................................... 717/101
See application file for complete search history.

(56) References Cited

U.S. PATENT DOCUMENTS

| | | | | |
|---|---|---|---|---|
| 5,293,629 | A * | 3/1994 | Conley et al. | 717/154 |
| 7,359,865 | B1 * | 4/2008 | Connor et al. | 705/7.28 |
| 7,774,743 | B1 * | 8/2010 | Sanchez et al. | 717/103 |
| 8,028,269 | B2 * | 9/2011 | Bhatia et al. | 717/103 |
| 2007/0006161 | A1 * | 1/2007 | Kuester et al. | 717/126 |
| 2007/0083859 | A1 * | 4/2007 | Fussell et al. | 717/168 |
| 2009/0254877 | A1 * | 10/2009 | Kuriakose et al. | 717/105 |
| 2011/0106738 | A1 * | 5/2011 | Cheklin | 706/14 |
| 2011/0283253 | A1 * | 11/2011 | Dutta et al. | 717/105 |

FOREIGN PATENT DOCUMENTS

KR 10-2010-0107898 10/2010 ............ G06Q 10/00

OTHER PUBLICATIONS

Kumata, Kenny H., et al., *"Reducing New System Risk: Performing Software Implementation Assessments"*, New Perspectives, Association of Healthcare Internal Auditors, Jun. 2009, pp. 6-9.

* cited by examiner

*Primary Examiner* — Wei Zhen
*Assistant Examiner* — Clint A Thatcher
(74) *Attorney, Agent, or Firm* — Michael A. Springs; Moore and Van Allen, PLLC; Peter B. Stewart (57) ABSTRACT

An apparatus of one embodiment evaluates standards compliance during software development. The apparatus includes an interface, a memory, and a processor. The interface is operable to receive design standards information, the design standards information including one or more design compliance rules for software development. The memory is operable to store the design standards information. The processor is communicatively coupled to the interface and the memory and is operable to determine a design status of a software change according to design information received regarding the software change; calculate one or more design compliance scores, each design compliance score indicating an extent to which the design status complies with at least one of the one or more design compliance rules; and determine whether to permit building of the change system based at least on the one or more design compliance scores.

14 Claims, 3 Drawing Sheets

310 — Navigational Tools

320:
Program Name: [Select Program ▼]  Chief Accountability Architect: [ ]
Domain: [Select Program ▼]
SEARCH

330:

| # | Program Name | Lead Assessor | Key Contact | RULES | | | | View |
|---|---|---|---|---|---|---|---|---|
| | | | | Design Quality | Testing | Deployment Manageability | Security Compliance | |
| 1 | Website Redesign | ... | ... | 3 | 3 | 3 | 3 | ... View |
| 2 | ATM Software Upgrade | ... | ... | 1 | 2 | 3 | 0 | ... View |
| 3 | ... | ... | ... | ... | ... | ... | ... | ... View |
| 4 | ... | ... | ... | ... | ... | ... | ... | ... View |
| 5 | ... | ... | ... | ... | ... | ... | ... | ... View |

SOFTWARE DEVELOPMENT STANDARDS COMPLIANCE SYSTEM

TECHNICAL FIELD OF THE INVENTION

The present invention relates generally to the field of software development and more particularly to a software development standards compliance system.

BACKGROUND OF THE INVENTION

Software development may involve a design phase, in which plans and other preparations for software changes are made, and a build phase, in which those plans and preparations are implemented. Companies, business units, or other organizations involved in software development may have various goals related to these software changes, such as business goals, technical goals, or other types of goals. The processes and frameworks utilized in the software development process may play an important role in improving achievement of or alignment with these goals.

SUMMARY OF THE DISCLOSURE

In accordance with the present invention, certain disadvantages and problems associated with software development standards compliance may be reduced or eliminated.

According to one embodiment, an apparatus of one embodiment evaluates standards compliance during software development. The apparatus includes an interface, a memory, and a processor. The interface is operable to receive design standards information, the design standards information including one or more design compliance rules for software development. The memory is operable to store the design standards information. The processor is communicatively coupled to the interface and the memory and is operable to determine a design status of a software change according to design information received regarding the software change; calculate one or more design compliance scores, each design compliance score indicating an extent to which the design status complies with at least one of the one or more design compliance rules; and determine whether to permit building of the change system based at least on the one or more design compliance scores.

Certain embodiments of the invention may provide one or more technical advantages. A technical advantage of one embodiment may allow for more effective enforcement of design standards and/or build standards during the software development process. Certain embodiments may also provide a more efficient and cost-effective mechanism for ensuring that standards are met before building and/or operation of the software change begins. Some embodiments may improve the efficiency of software development and improve the speed-to-market, stability, and overall quality of software changes. Furthermore, certain embodiments may improve end-to-end program governance and accountability by providing a framework for associating design, build, or operational errors with particular compliance rules and/or particular individuals or organizations. Certain embodiments may also improve communication and collaboration during the development of software changes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
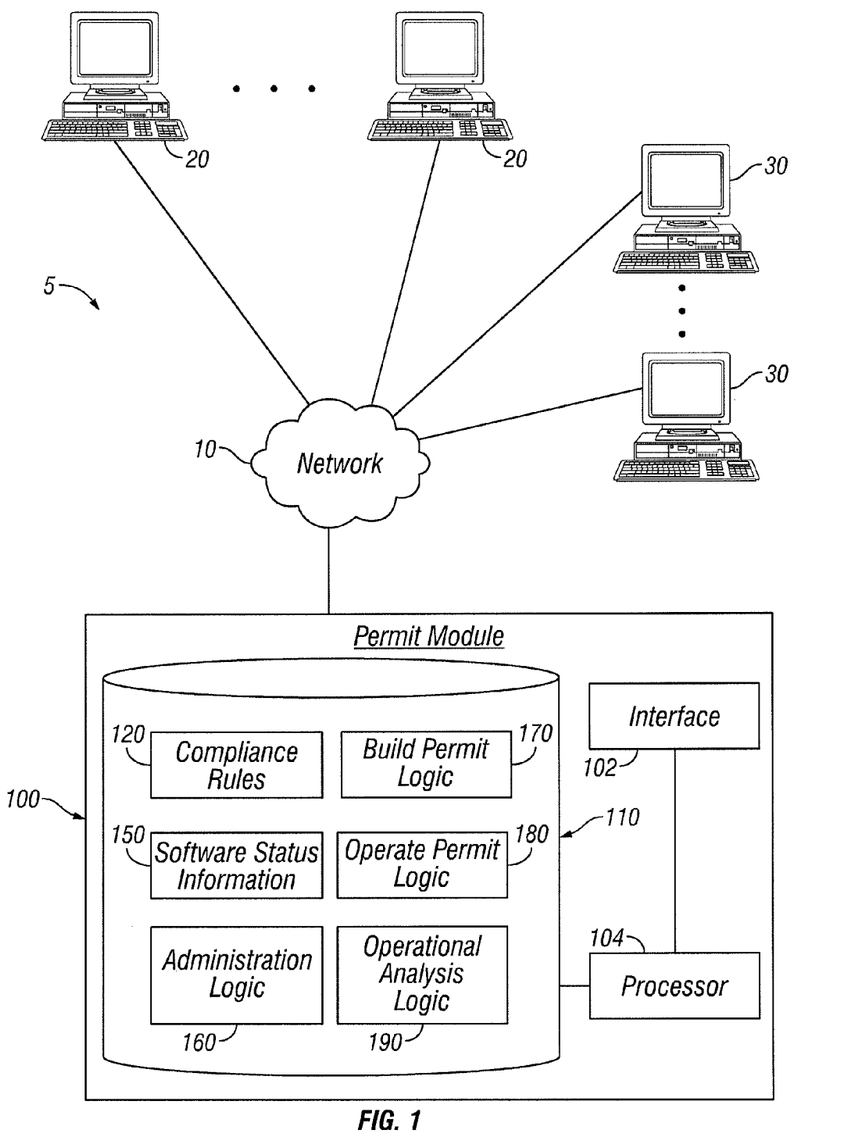
FIG. 1 illustrates an example system that facilitates software development standards compliance.
Figure 2:
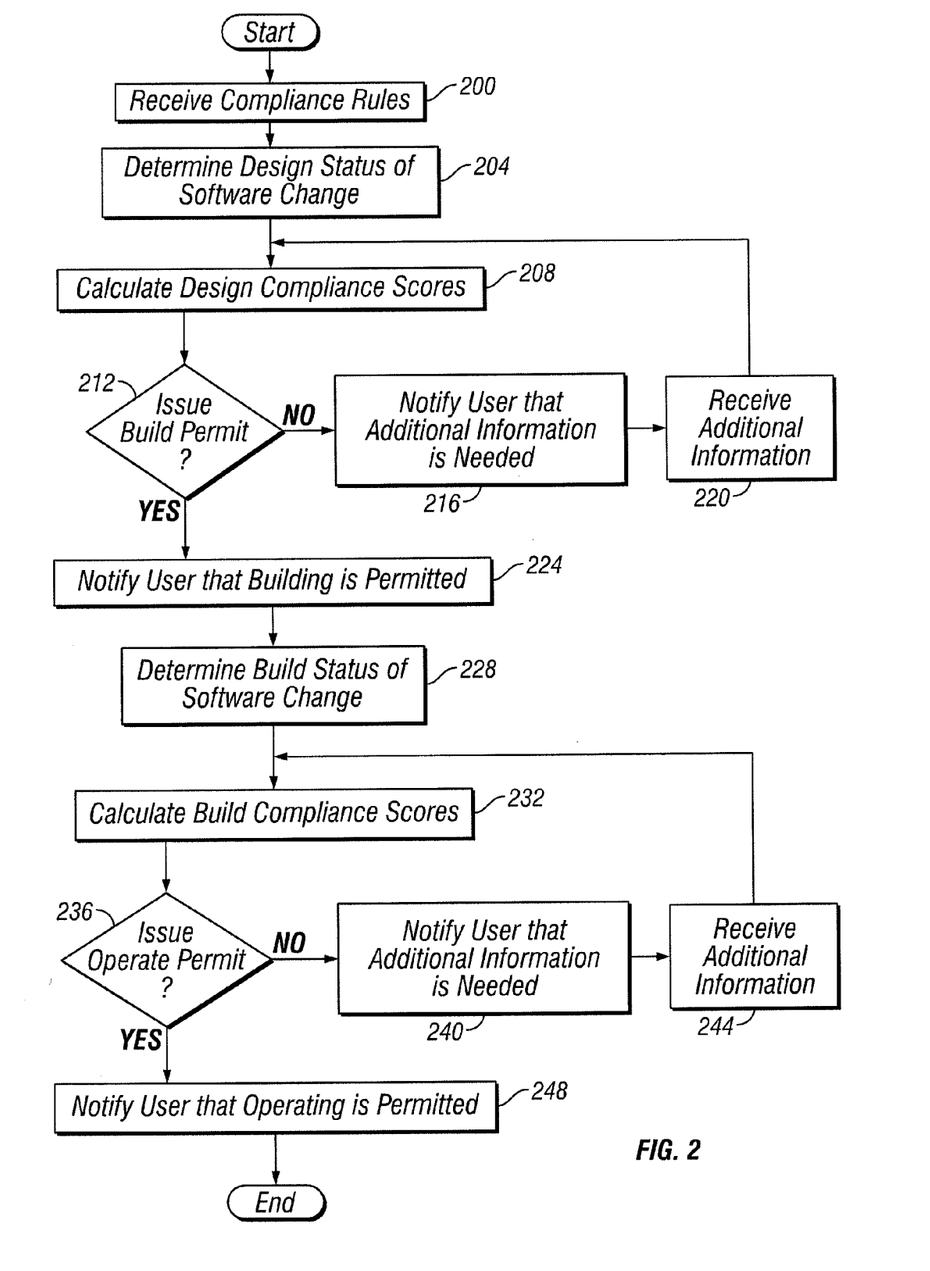
FIG. 2 illustrates an example software development standards compliance sequence.
Figure 3:
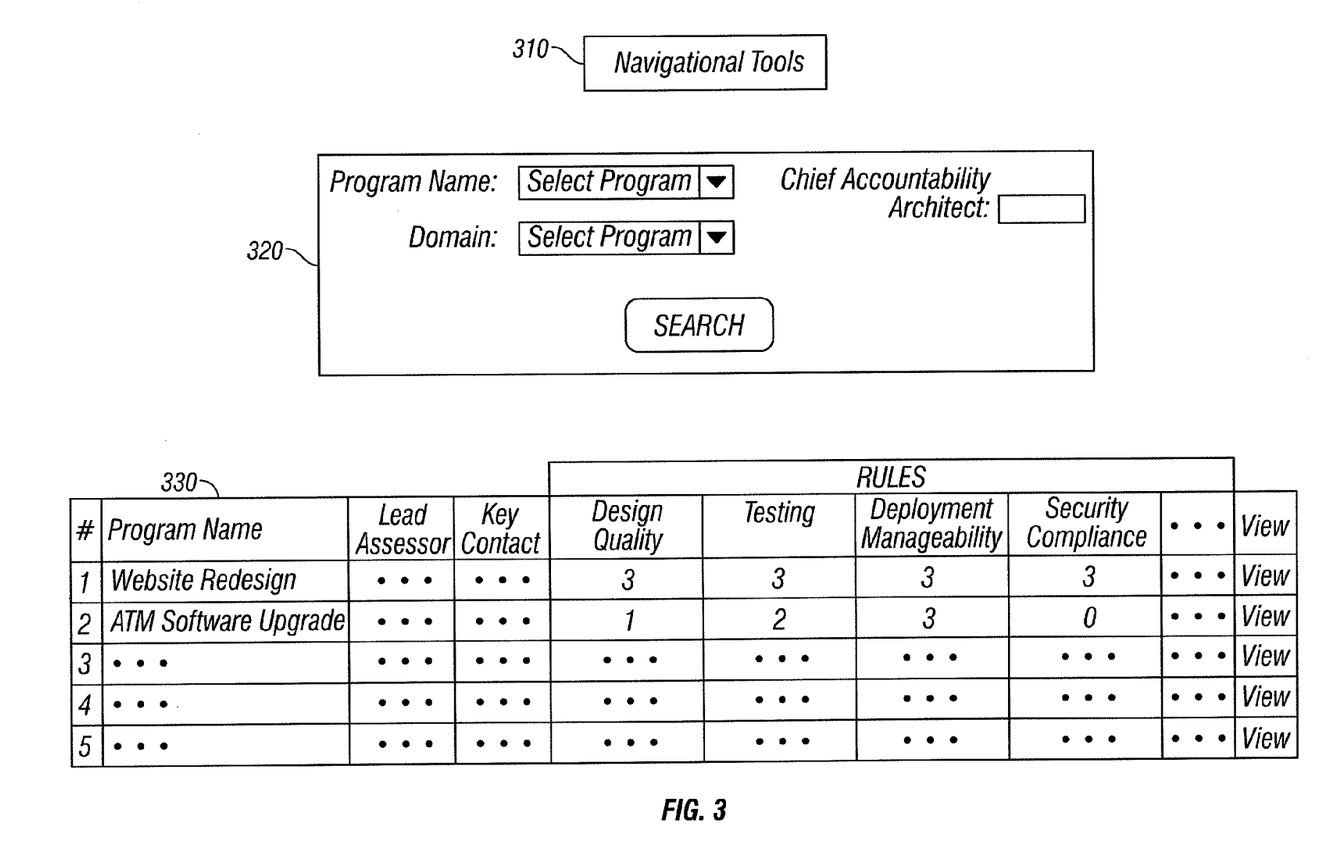
FIG. 3 illustrates an example GUI that facilitates user interaction with a standards compliance system.

Embodiments of the present invention and its advantages are best understood by referring to FIGS. 1 through 3, like numerals being used for like and corresponding parts of the various drawings.

FIG. 1 illustrates an example system 5 that facilitates software development standards compliance. System 5 includes permit module 100, which communicates with one or more endpoints 20 and one or more workstations 30 over network 10. Permit module 100 includes processor 104, which is communicatively coupled to network interface 102, and memory 110. Memory 110 includes compliance rules 120, software change status information 150, administration logic 160, build permit logic 170, operate permit logic 180, and operational analysis logic 190, which facilitate standards compliance during software development.

Permit module 100 facilitates compliance with one or more standards during the design, implementation, and use of a software change. One or more compliance rules 120, which may include design compliance rules and build compliance rules, are communicated from endpoint 20 to permit module 100 over network 10 and stored in memory 110. Permit module 100 then evaluates the status of the software change's design and then calculates compliance scores based on the extent to which the design status complies with the design compliance rules. Based on these compliance scores, permit module 100 determines whether to issue a build permit for the software change, allowing building of the software change to begin. Issuing build permits for software changes in this manner may allow for more effective enforcement of design standards during the software development process. Issuing build permits for software changes in this manner may also provide a more efficient and cost-effective mechanism for ensuring that certain standards are met before implementation of the software change can begin.

Once the build permit issues and implementation of the software change begins, permit module 100 evaluates the status of the building of the software change and calculates compliances scores based on the extent to which the build status complies with the build compliance rules. Based on these compliance scores, permit module 100 determines whether to issue an operate permit for the software change, allowing operation of the software change to begin. Issuing operate permits for software changes in this manner may allow for more effective enforcement of build standards during the software development process, which may improve the quality of software changes. Issuing operate permits for software changes in this manner may also provide a more efficient and cost-effective mechanism for ensuring that certain standards are met before software changes are put into operation.

As used herein, the term "software change" refers to a software development project. Such software development projects include projects that are designed or implemented from scratch, "update" projects that involve modifying and/or adding to a previous project, or any other type of software development project. Software changes may include a design phase in which plans for the software change are developed. The design process may include preparation of various design documents such as, for example, specifications, goals, software architecture documents, or any other suitable type of design document. Software changes also include a build phase in which previously developed plans are implemented. This process may include procuring, configuring, and otherwise setting up hardware components; writing code, configuration files, or other aspects of software; and testing the hardware and/or software. The separation of design and build phases does not require that they are mutually exclusively. For example, the design of a software change may be modified during the building phase.

According to the illustrated embodiment, system 5 includes endpoints 20 that communicate with permit module 100 through network 10. Endpoints 20 may include one or more laptops, personal computers, monitors, display devices, handheld devices, smartphones, servers, user input devices, or any other suitable component for enabling the communication of standards information. Endpoints 20 communicate standards information to permit module 100. For example, a personal computer may be used to submit standards information to permit module 100 through network 10, enabling permit module 100 to enforce compliance with these standards during the designing, building, and operating of a software change. This standards information may be design standards information, which includes one or more design compliance rules, and/or build standards information, which includes one or more build compliance rules. Design compliance rules describe requirements or recommendations for the design and/or operation of a software change. For example, design compliance rules may describe requirements or recommendations relating to strategic alignment, which may include business strategy alignment, technology strategy alignment, or infrastructure strategy alignment; information security compliance; data management; design quality, which may include resiliency, performance, scalability, complexity, or capacity management; resource readiness, which may include human resources and documentation; testing, which may include testing strategy, comprehensiveness, and code management; operational manageability, which may include system and operational documentation as well as control and warranty phase plans; deployment manageability; or monitoring, which may include monitoring comprehensiveness or design. Build compliance rules describe requirements or recommendations for the building and/or operation of a software change. For example, build compliance rules may describe requirements or recommendations relating to design quality, monitoring, testing, system and operational documentation, deployment manageability, operational manageability, capacity management, security compliance, people readiness, or control and warranty phase plans. One or more of the build compliance rules may be related to, similar to, or identical to one or more of the design compliance rules.

Workstations 30 enable one or more users to monitor, administer, or otherwise interact with permit module 100. Workstations 30 may include one or more laptops, personal computers, monitors, display devices, handheld devices, smartphones, servers, user input devices, or other suitable components for enabling user input. During operation of permit module 100, a workstation 30 enables a user to monitor the status of a software change. For example, workstation 30 allows a user to monitor whether a software change has received a build permit or an operate permit. Workstation 30 also enables monitoring design compliance scores associated with a software change, as discussed below in reference to FIG. 3. In some embodiments, workstation 30 may also allow users to monitor errors or other problems associated with a software change. For example, a user could monitor the status of a software change that has received an operate permit and is currently in use in order to facilitate the association of an operational error with an underlying compliance rule or one or more individuals responsible for that aspect of the software change. Enabling such associations may allow users to identify shortcomings in the underlying compliance rules, which may facilitate the improvement of these standards, or provide a more effective and efficient accountability mechanism. In some embodiments, workstation 30 and endpoint 20 may be integrated or may be the same device.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Permit module 100 represents any suitable components that facilitate software development standards compliance in system 5. Permit module 100 may include a network server, remote server, mainframe, host computer, workstation, web server, personal computer, file server, or any other suitable device operable to communicate with endpoints 20 and process data. In some embodiments, permit module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of permit module 100 may be performed by any suitable combination of one or more servers or other components at one or more locations. In the embodiment where the modules are servers, the servers may be public or private servers, and each server may be a virtual or physical server. The server may include one or more servers at the same or at remote locations. Permit module 100 may also include any suitable component that functions as a server. In some embodiments, endpoint 20 and/or workstation 30 may be integrated with permit module 100, or they may operate as part of the same device or devices.

In the illustrated embodiment, permit module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 receives from endpoints 20 design standards information and build standards information. As another example, network interface 102 communicates information regarding a software change's compliance scores to workstations 30 to facilitate monitoring and administration of standards compliance. Network interface 102 represents any port or connection, real or virtual, including any suitable hardware and/or software, including protocol conversion and data processing capabilities, to communicate through a LAN, WAN, or other communication system that allows permit module 100 to exchange information with network 10, endpoints 20, workstations 30, other permit modules 100, or other components of system 5.

Processor 104 communicatively couples to network interface 102 and memory 110, and controls the operation and administration of permit module 100 by processing information received from network interface 102 and memory 110. Processor 104 includes any hardware and/or software that operates to control and process information. For example, processor 104 executes build permit logic 170 to control the determination of whether to permit building of software changes and executes operate permit logic 180 to control the determination of whether to permit operating of software changes. Processor 104 may be a programmable logic device, a microcontroller, a microprocessor, any suitable processing device, or any suitable combination of the preceding.

Memory 110 stores, either permanently or temporarily, data, operational software, or other information for processor 104, other components of permit module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. While illustrated as including particular modules, memory 110 may include any suitable information for use in the operation of permit module 100. In the illustrated embodiment, memory 110 includes compliance rules 120, software change status information 150, administration logic 160, build permit logic 170, operate permit logic 180, and operational analysis logic 190.

Compliance rules 120 represent any suitable information operable to facilitate the determination of whether a software change is in compliance with one or more standards. Compliance rules 120 also represent any suitable set of instructions, logic, or code embodied in a computer-readable storage medium and operable to facilitate the determination of whether a software change is in compliance with one or more standards. Permit module 100 may evaluate status information associated with the software change against one or more compliance rules 120 to determine whether to issue a build permit or an operation permit. Compliance rules 120 may include design compliance rules or build compliance rules.

Design compliance rules describe requirements or recommendations for the design and/or operation of a software change. For example, design compliance rules may describe requirements or recommendations relating to strategic alignment, which may include business strategy alignment, technology strategy alignment, or infrastructure strategy alignment; information security compliance; data management; design quality, which may include resiliency, performance, scalability, complexity, or capacity management; resource readiness, which may include human resources and documentation; testing, which may include testing strategy, comprehensiveness, and code management; operational manageability, which may include system and operational documentation as well as control and warranty phase plans; deployment manageability; or monitoring, which may include monitoring comprehensiveness or design.

Build compliance rules describe requirements or recommendations for the building and/or operation of a software change. For example, build compliance rules may describe requirements or recommendations relating to design quality, monitoring, testing, system and operational documentation, deployment manageability, operational manageability, capacity management, security compliance, people readiness, or control and warranty phase plans. One or more of the build compliance rules may be related to, similar to, or identical to one or more of the design compliance rules. Application of compliance rules 120 during the design, building, and operation of a software change may increase the efficiency of the software development process and improve the speed-to-market, stability, and overall quality of the software change. Application of compliance rules 120 may also improve end-to-end program governance and accountability by providing a framework for associating design, build, or operational errors with particular rules and/or particular individuals or organizations.

Software change status information 150 may include design status information, build status information, or operation status information of a software change. Design status information may indicate the completeness or quality of various aspects of the design (such as, for example, documentation, designer communications, testing plans, or security design compliance), various errors or problems associated with the design (such as, for example, missing documents or resources, design flaws, or design deadlines), or any other information indicating the status of the software change's design. Design status information may be used to calculate compliance scores that enable permit module 100 to determine whether to issue a build permit for the software change. Build status information may indicate the completeness or quality of various aspects of the build (such as, for example, source code, operational objectives, testing results, or security compliance), various errors or problems associated with the build (such as, for example, compiling errors, missed build deadlines, operational shortcomings), or any other information indicating the status of the software change's build. Build status information may be used to calculate compliance scores that enable permit module 100 to determine whether to issue an operate permit for the software change. Operation status information may indicate the quality or effectiveness of various aspects of the software change's operation (such as, for example, processing speed, operational objectives, security compliance, user complaints, or monitoring results), various errors or problems associated with the operation of the software change (such as, for example, runtime errors, user complaints, or other operational shortcomings), or any other information indicating the status of the software change's operation. Operation status information may enable permit module 100 to associate the software change's operation status with one or more individuals, groups, organizations, and/or compliances rules.

Administration logic 160 represents any suitable set of instructions, logic, or code embodied in a computer-readable storage medium and operable to facilitate the administration of permit module 100. Administration logic 160 enables one or more administrators to view, add, delete, or modify one or more compliance rules, status information, associations between compliance rules and one or more entities, compliance scores, build permits, or operate permits. For example, administration logic 160 may operate to present a graphical user interface ("GUI") on a user's display (such as, for example, workstation 30) with which the user can interact to perform one or more of the tasks described above. Such an example is described in greater detail below in reference to FIG. 3. In presenting a GUI, administration logic 160 may also utilize images, text, or other assets. Administration logic 160 may be stored in memory 110 or another memory associated with permit module 100. Administration logic 160, or portions thereof, may also be embodied in hardware associated with permit module 100 or other components of system 5. Furthermore, the components of administration logic 160 may be stored in the same or different memories of the same or different permit modules 100. Various components of administration logic 160 may also be stored in different components of system 5.

Build permit logic 170 represents any suitable set of instructions, logic, or code embodied in a computer-readable storage medium and operable to facilitate the issuance of a build permit for a software change. Build permit logic 170 may be stored in memory 110 or another memory associated with permit module 100. Build permit logic 170, or portions thereof, may also be embodied in hardware associated with permit module 100 or other components of system 5. Furthermore, the components of build permit logic 170 may be stored in the same or different memories of the same or different permit modules 100. Various components of build permit logic 170 may also be stored in different components of system 5.

In operation, building permit logic 170 evaluates the design status of a software change and determines whether to permit building of the software change. To accomplish this, building permit logic 170 determines a design status of a software change according to design information received regarding the software change. The design status includes design status information, which may indicate the completeness or quality of various aspects of the software change's design (such as, for example, documentation, designer communications, testing plans, or security design compliance), various errors or problems associated with the design (such as, for example, missing documents or resources, design flaws, or design deadlines), or any other information indicating the status of the software change's design. This design status is used to calculate one or more design compliance scores, which indicate the extent to which the design status of the software change complies with one or more design compliance rules.

In a particular embodiment, compliance scores range from 0 to 3, a score of 0 indicating that the rule is not applicable to the software change, a score of 1 indicating that the aspect of the software change associated with the rule is either not in place or fails an evaluation due to having too many exceptions to be effective, a score of 2 indicating that the aspect of the software change associated with the rule is in place and effective with minor gaps, and a score of 3 indicating that the aspect of the software change associated with the rule is in place and passes the evaluation as effective. However, numerous scoring metrics are possible. For example, other embodiments may utilize a 0-10 scale, a pass-fail scale, a color-coded scale, any other scale suitable for compliance scoring, or any combination thereof.

In some embodiments, each design compliance rule has a rule type (such as, for example, "non-negotiable," "critical," or "recommended"), which indicates the impact on the build permit determination of the compliance score associated with that rule. For example, a rule type of "non-negotiable" may indicate that a low design compliance score for that design compliance rule results in automatic denial of a build permit for the software change, while a rule type of "recommended" may indicate that a low design compliance score for that design compliance rule will not automatically result in denial of a build permit (though it may result in one or more notifications related to the compliance score). As a particular example, a security compliance rule may have a "non-negotiable" rule type, indicating that a low compliance score for the security compliance rule would result in automatic denial of the build permit. Based at least in part on the design compliance scores, build permit logic 170 determines whether to permit building of the software change. In some embodiments, build permit logic 170 also communicates a permit notification to one or more users indicating that building of the software change is permitted or that additional information or action is needed before building of the software change is permitted. This mechanism of evaluating and approving the build of a software change may increase the efficiency of the software development process and improve the speed-to-market, stability, and overall quality of the software change since aspects of the software changes that are important to swiftly, efficiently, and effectively developing software may be verified before building can begin.

Operate permit logic 180 represents any suitable set of instructions, logic, or code embodied in a computer-readable storage medium and operable to facilitate the issuance of an operate permit for a software change. Operate permit logic 180 may be stored in memory 110 or another memory associated with permit module 100. Operate permit logic 180, or portions thereof, may also be embodied in hardware associated with permit module 100 or other components of system 5. Furthermore, the components of operate permit logic 180 may be stored in the same or different memories of the same or different permit modules 100. Various components of operate permit logic 180 may also be stored in different components of system 5.

In operation, operate permit logic 180 evaluates the build status of a software change and determines whether to permit operation of the software change. To accomplish this, operate permit logic 180 determines a build status of a software change according to build information received regarding the software change. The build status includes build status information, which may indicate the completeness or quality of various aspects of the build (such as, for example, source code, operational objectives, testing results, or security compliance), various errors or problems associated with the build (such as, for example, compiling errors, missed build deadlines, operational shortcomings), or any other information indicating the status of the software change's build. This build status is used to calculate one or more build compliance scores, which indicate the extent to which the build status of the software change complies with one or more build compliance rules. In some embodiments, each build compliance rule has a rule type (such as, for example, "non-negotiable," "critical," or "recommended"), which indicates the impact on the build permit determination of the compliance score associated with that rule. For example, a rule type of "non-negotiable" may indicate that a low build compliance score for that build compliance rule results in automatic denial of an operate permit for the software change, while a rule type of "recommended" may indicate that a low build compliance score for that build compliance rule will not automatically result in denial of an operate permit (though it may result in one or more notifications related to the compliance score). As a particular example, a build testing rule may have a "non-negotiable" rule type, indicating that a low compliance score for the security compliance rule would result in automatic denial of the operate permit. As another example, a people readiness rule may have a "critical" rule type, indicating that a low compliance score for that rule would require review and approval by a one or more individuals before an operate permit is issued, but will not automatically result in permit denial. Based at least in part on the build compliance scores, operate permit logic 180 determines whether to permit operating of the software change. In some embodiments, operate permit logic 180 also communicates a permit notification to one or more users indicating that the software change can be put into production or that additional information or action is needed before the software change can be put into production. This mechanism of evaluating and approving the build of a software change before operating can begin may allow for more effective enforcement of build standards during the software development process. Issuing operate permits for software changes in this manner may also provide a more efficient and cost-effective mechanism for ensuring that certain standards are met before the software change can be put into production.

Operational analysis logic 190 represents any suitable set of instructions, logic, or code embodied in a computer-readable storage medium and operable to facilitate. Operational analysis logic 190 may be stored in memory 110 or another memory associated with permit module 100. Operational analysis logic 190, or portions thereof, may also be embodied in hardware associated with permit module 100 or other components of system 5. Furthermore, the components of operational analysis logic 190 may be stored in the same or different memories of the same or different permit modules 100. Various components of operational analysis logic 190 may also be stored in different components of system 5.

In operation, operational analysis logic 190 evaluates the operating status of the software change and associates the operating status with one or more compliance rules. For example, operational analysis logic 190 may identify an error associated with the operation of the software change and associate the error with a compliance rule. As one example, operational analysis logic 190 may identify a runtime error associated with a software that was issued an operate permit. Operational analysis logic 190 may then identify a build testing compliance rule associated with the aspect of the software change that produced the error and, optionally, communicate a notification of the error and its associated compliance rule to one or more users. As another example, operational analysis logic 190 may identify a security failure while monitoring the operation of the software change. Operational analysis logic 190 may then identify one or more security compliance rules associated with the security failure and, optionally, communicate a notification of the security failure and its associated security compliance rule or rules to one or more users. Operational analysis logic 190 may also associate an error with one or more individuals, groups, or organizations who were responsible for that aspect of the software change or who were responsible for evaluating the software change against the implicated compliance rule. Identifying errors and associating them with compliance rules or one or more entities may allow for improved accountability in the software development process since the compliance rule and/or a particular person, group, or organization that may be at least partially responsible for the error can be effectively and efficiently identified. Identifying errors and associating them with compliance rules or one or more entities may also provide improved end-to-end program governance since oversight of the software development process can be managed through an integrated framework.

In an exemplary embodiment of operation, a user submits standards information at endpoint 20, which then communicates the standards information, including compliance rules 120, to permit module 100, which stores the standards information in memory 110. After design of a software change begins, permit module 100 executes build permit logic 170, which facilitates determining a design status of the software change and calculating design compliance scores based on the extent to which the design status complies with the design compliance rules. Based on these design compliance scores, permit module 100 determines whether to permit building of the software change, in which case a notification that building of the software change has been permitted is communicated to one or more users. If building is not permitted, permit module 100 notifies one or more users that additional information or action is required before building can be permitted. After building of the software change begins, permit module 100 executes operate permit logic 180, which facilitates determining a build status of the software change and calculating build compliance scores based on the extent to which the build status complies with the build compliance rules. Based on these build compliance scores, permit module 100 determines whether to permit operation of the software change, in which case a notification that operating of the software change has been permitted is communicated to one or more users. If operating is not permitted, permit module 100 notifies one or more users that additional information or action is required before operating can be permitted. In some embodiments, users of workstations 30 may monitor the status of the software development. For example, a user of workstation 30 may communicate a request for the compliance scores associated with one or more software changes. Permit module 100 may execute administration logic 160 to facilitate the communication of a score response including the compliance scores to the user. In certain embodiments, once operating of the software change begins, permit module 100 executes operational analysis logic 190 to monitor the operational status of the software change and associate errors that occur with one or more compliance rules and/or one or more individuals, groups, or organizations.

A component of system 5 may include an interface, logic, memory, and/or other suitable element. An interface receives input, sends output, processes the input and/or output, and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 5 without departing from the scope of the invention. For example, system 5 may implement standards compliance procedures different from or in addition to those described herein. As another example, multiple permit modules 100 may operate in parallel to facilitate standards compliance. As yet another example, compliance rules 120 may be configurable by a user of permit module 100, endpoint 20, or workstation 30, facilitating the modification of existing rules, deletion of existing rules, or insertion of additional rules. System 5 may include any number of endpoints 20, networks 10, permit modules 100, and workstations 30. Any suitable logic may perform the functions of system 5 and the components within system 5.

FIG. 2 is a diagram that illustrates an example software development standards compliance sequence of permit module 100.

At step 200, permit module 100 receives compliance rules 120 from an endpoint 20. Compliance rules 120 may include design compliance rules or build compliance rules. Design compliance rules describe requirements or recommendations for the design and/or operation of a software change. Build compliance rules describe requirements or recommendations for the building and/or operation of a software change. One or more of the build compliance rules may be related to, similar to, identical to, or associated with one or more of the design compliance rules.

At step 204, permit module 100 determines a design status of the software change. The design status includes design status information, which may indicate the completeness or quality of various aspects of the software change's design (such as, for example, documentation, designer communications, testing plans, or security design compliance), various errors or problems associated with the design (such as, for example, missing documents or resources, design flaws, or design deadlines), or any other information indicating the status of the software change's design. Permit module 100 may determine the design status by monitoring files, systems, or other aspects of the software change's design. In some embodiments, permit module 100 may also receive input from one or more users indicating design status information.

At step 208, permit module 100 calculates design compliances scores. These design compliance scores indicate the extent to which the design status of the software change complies with one or more design compliance rules. In some embodiments, each design compliance rule has a rule type (such as, for example, "non-negotiable," "critical," or "recommended"), which indicates the impact on the build permit determination of the compliance score associated with that rule. For example, a rule type of "non-negotiable" may indicate that a low design compliance score for that design compliance rule results in automatic denial of a build permit for the software change, while a rule type of "recommended" may indicate that a low design compliance score for that design compliance rule will not automatically result in denial of a build permit (though it may result in one or more notifications related to the compliance score).

At step 212, permit module 100 determines whether the design compliance scores warrant issuance of a build permit. This determination is based at least in part on the design compliance scores, and, in some embodiments, the rule type of the compliance rule associated with each compliance score. For example, in some instances, permit module 100 may determine that a build permit should be issued because the compliances scores indicate that all design compliance rules have been fully complied with. If permit module 100 does determine that a build permit is warranted, the sequence proceeds to step 224. However, in some cases, permit module may determine that a building permit is not warranted. This may occur if, for example, a compliance rule that has a "non-negotiable" type has a corresponding compliance score indicating that the rule have not been complied with. In such cases, the sequence proceeds to step 216.

At step 216, permit module 100 notifies a user that additional design information is needed. This notification may involve sending an email to the user, sending a text message to the user, notifying the user via an application that runs on workstation 30 or another device, or any other suitable form of notification. The notification may identify the compliance rule or rules that resulted in denial of the build permit, provide information about the design status, request further information from the user, request further action by the user, and/or provide any information necessary to inform the user about the issue.

At step 220, permit module 100 receives additional design information following the request by permit module 100 to provide additional information. Such information may be design document updates, testing plan updates, user input overriding the denial of the build permit, or any other information regarding the design of the software change. After the additional information has been received, permit module 100 may return to step 208 and reevaluate the compliance scores. In some embodiments, an administrator may be able to bypass this recalculation and proceed directly to step 224.

At step 224, permit module 100 communicates a notification of a build permit for the software change. The build permit indicates that building of the software change can proceed. Evaluating and approving the build of a software change in this manner may increase the efficiency of the software development process and improve the speed-to-market, stability, and overall quality of the software change since aspects of the software changes that are important to swiftly, efficiently, and effectively developing software may be verified before building can begin. Once building of the software change commences, permit module 100 may proceed to step 228.

At step 228, permit module 100 determines a build status of the software change. Build status may include build status information indicating the completeness or quality of various aspects of the build (such as, for example, source code, operational objectives, testing results, or security compliance), various errors or problems associated with the build (such as, for example, compiling errors, missed build deadlines, operational shortcomings), or any other information indicating the status of the software change's build. Build status information may be used later to calculate compliance scores that enable permit module 100 to determine whether to issue an operate permit for the software change. Permit module 100 may determine the build status by monitoring files, systems, or other aspects of the software change's build. In some embodiments, permit module 100 may also receive input from one or more users indicating build status information.

At step 232, permit module 100 calculates build compliance scores. These build compliance scores indicating the extent to which the build status of the software change complies with one or more build compliance rules. In some embodiments, each build compliance rule has a rule type (such as, for example, "non-negotiable," "critical," or "recommended"), which indicates the impact on the build permit determination of the compliance score associated with that rule. For example, a rule type of "non-negotiable" may indicate that a low build compliance score for that build compliance rule results in automatic denial of an operate permit for the software change, while a rule type of "recommended" may indicate that a low build compliance score for that build compliance rule will not automatically result in denial of an operate permit (though it may result in one or more notifications related to the compliance score).

At step 236, permit module 100 determines whether the build compliance scores warrant issuance of an operate permit. This determination is based at least in part on the build compliance scores, and, in some embodiments, the rule type of the compliance rule associated with each compliance score. For example, in some instances, permit module 100 may determine that an operate permit should be issued because the compliances scores indicate that all build compliance rules have been fully complied with. If permit module 100 does determine that an operate permit is warranted, the sequence proceeds to step 248. However, in some cases, permit module may determine that an operate permit is not warranted. This may occur if, for example, a compliance rule that has a "non-negotiable" type has a corresponding compliance score indicating that the rule has not been complied with. In such cases, the sequence proceeds to step 240.

At step 240, permit module 100 notifies a user that additional build information is needed. This notification may involve sending an email to the user, sending a text message to the user, notifying the user via an application that runs on workstation 30 or another device, or any other suitable form of notification. The notification may indicate the compliance rule or rules that resulted in denial of the operate permit, provide information about the build status, request further information from the user, request further action by the user, and/or provide any information necessary to inform the user about the issue.

At step 244, permit module 100 receives additional build information following the request by permit module 100 to provide additional information. Such information may be code updates or additions, bug fixes, additional testing, user input overriding the denial of the operate permit, or any other information regarding the build of the software change. After the additional information has been received, permit module 100 may return to step 232 and reevaluate the compliance scores. In some embodiments, an administrator may be able to bypass this recalculation and proceed directly to step 248.

At step 248, permit module 100 communicates a notification of an operate permit for the software change. The operate permit indicates that the software change can be put into production. Evaluating and approving the build of a software change in this manner may increase the efficiency of the software development process and improve the speed-to-market, stability, and overall quality of the software change since aspects of the software changes that are important to providing accurate, stable software that aligns with the goals of the company developing and/or using it can be verified efficiently and effectively before the software change is put into production. End-to-end governance and accountability may also be improved since downstream aspects of the software development can be associated with earlier aspects of the development. Furthermore, this mechanism of evaluating and approving the build of a software change before operating can begin may allow for more effective enforcement of build standards during the software development process. Issuing operate permits for software changes in this manner may also provide a more efficient and cost-effective mechanism for ensuring that certain standards are met before the software change can be put into production.

Various embodiments may perform some, all, or none of the steps described above. For example, certain embodiments may omit steps 204, 218, 224, 228, 240, and/or 248 under certain conditions, or they may omit these steps entirely. Furthermore, certain embodiments may perform these steps in different orders or in parallel. While discussed as permit module 100 performing these steps, any suitable component of system 5 may perform one or more steps of the method.

FIG. 3 illustrates an example GUI 300, which facilitates administrating, monitoring, and otherwise interacting with permit module 100. GUI 300 may be presented on a display of one or more workstations 30 following execution of administration logic 160. GUIs 300 are generally operable to tailor and filter data entered by and presented to the user. GUI 300 may provide the user with an efficient and user-friendly presentation of information and may comprise a plurality of displays having interactive fields, pull-down lists, and buttons operated by the user. Different embodiments of GUI 300 may utilize common components, information, or computer code. GUIs 300 may include multiple levels of abstraction including groupings and boundaries. It should be understood that the term GUI may be used in the singular or in the plural to describe one or more GUIs 300 and each of the displays of a particular GUI 300.

GUI 300 facilitates review and input by a user related to one or more software changes. GUI 300 includes navigational tools area 310, search area 320, and software change information area 330.

Navigational tools area 310 facilitates navigation through various views of information related to the software changes. For example, navigational tools area 310 may include links, tabs, buttons, or any other suitable component to enable a user to navigate to a different view.

Search area 320 facilitates searching for one or more software changes. As shown in FIG. 3, search area 320 may include components that enable searching by program name, domain, and chief accountability architect. A program name may be the name of a software change or group of software changes. A domain may be an organization, grouping, characterization, or other category associated with one or more software changes. A chief accountability architect is an individual, group, or other entity associated with a software change and accountable for one or more compliance rules as applied to that software change. In various embodiments, the search components may be drop-down menus, lists, hyperlinks, buttons, text boxes, or any other suitable component for facilitating searching. As one example of user interaction with search area 320, a user may interact with a "program name" drop-down menu, which then displays a list of software changes, and the user may then select the desired entry and interact with the "search" button to search for one or more software changes.

Software change information area 330 facilitates user review of one or more software changes. As illustrated in FIG. 3, software change information area 330 includes a list of search results, including for each software change a program name, a lead assessor, a key contact, one or more compliance rules and their corresponding scores, and a button that facilitates viewing additional information about the software change. Other embodiments may include all, some, or none of this information, and they may include additional information and utilize difference layouts.

Similar GUIs 300 may also be used to facilitate other aspects of monitoring and administering one or more software changes. Furthermore, various GUIs may have some, all, or none of the components shown in FIG. 3. Various GUIs may also have additional components. For example, some embodiments of GUI 300 may have different numbers and types of buttons in navigational tools area 310 and search area 320, may present different pieces of information in software change information area 330, and may have different layouts of the various components. Additional GUIs may facilitate notification of permits, notification of permit rejections, and review of errors associated with software changes. For example, a GUI may be utilized to facilitate review of errors and associated compliance rules and/or accountable entities after a software change goes into production following the issuance of an operate permit. Furthermore, certain GUIs may provide different views and/or different information depending on which user is interacting with the GUI. For example, a software developer may be presented with a view showing only his software change, a program manager may be presented with information related to all software changes within his purview, and a higher level officer may be able to review all software changes within an organization. Furthermore, different individuals or groups of individuals may have different review options. For example, a software developer may be able view the compliance scores for his project, while higher level individuals may be able to both view and edit compliance scores.

The evaluation of standards compliance by permit module 100 and subsequent presentation of GUI 300 to facilitate user review of software changes may provide a more uniform, efficient, and reliable method of enforcing standards compliance during software development. For example, GUIs 300 may provide a single set of interfaces for facilitating review of multiple types of software changes. This integrated framework may provide a more cost-effective mechanism for enforcing standards compliance during software development since multiple projects can be reviewed and evaluated through a single tool. Furthermore, the integration and association of design, build, and operating information within a single tool may also facilitate improved end-to-end governance and collaboration between different stakeholders.

Certain embodiments of the invention may provide one or more technical advantages. A technical advantage of one embodiment may provide improved end-to-end governance during software development. Another technical advantage of an embodiment allows for improved communication and collaboration regarding design and build standards during the software development. Certain embodiments may also provide improved development efficiency, shorter time-to-market for software changes, and improved software stability and flexibility. Furthermore, some embodiments may provide a more effective and efficient mechanism for ensuring that software changes align with various design, build, and operating standards.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 102, one or more portions of processor 104, one or more portions of memory 110, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, permit module 100 may have different types, numbers, and configurations of interface 102, processor 104, memory 110, or any components thereof. For example, various embodiments may utilize different numbers and types of compliance rules 120. As another example, certain embodiments may determine and store software change status information 150 and use this information to calculate compliance scores, while other embodiments may evaluate the status of the software change directly and calculate compliance scores without storing discrete pieces of status information aside from compliance scores.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An apparatus for evaluating standards compliance during software development, comprising: an interface operable to: receive design standards information, the design standards information comprising one or more design compliance rules for software development; communicate a first request notification to the user, the first request notification indicating that additional design information is needed before building of the software change is permitted; communicate a build permit notification to a user, the build permit notification indicating that building of a software change is permitted; receive building standards information, the building standards information comprising one or more building compliance rules for the software development; and communicate an operate permit notification to the user, the operate permit notification indicating that operating of the software change is permitted; a memory operable to store the design standards information; and a processor communicatively coupled to the interface and the memory, the processor operable to: determine a design status of the software change according to design information received regarding the software change; calculate one or more design compliance scores, each design compliance score indicating an extent to which the design status complies with at least one of the one or more design compliance rules; determine whether to permit building of the change system based at least on the one or more design compliance scores; generate, in response to determining that building of the software change is not permitted, the first request notification; communicate the first request notification to the interface; generate, in response to determining to permit building of the software change, the build permit notification; communicate the build permit notification to the interface; determine a building status of the software change according to building information received regarding the software change; calculate one or more building compliance scores, each building compliance score indicating an extent to which the information indicating the building status of the software change complies with at least one of the one or more building compliance rules; determine whether to permit operation of the software change based at least on the one or more building compliance scores; generate, in response to determining to permit operation of the software change, the operate permit notification; and communicate the operate permit notification to the interface.

2. The apparatus of claim 1, wherein each design compliance rule comprises a rule type, the rule type indicating an impact of the design compliance score associated with each design compliance rule on the determination of whether to permit building of the software change.

3. The apparatus of claim 1, wherein: the interface is further operable to: receive a request from the user for at least one of the one or more design compliance scores; and communicate a score response to the user, the score response comprising the at least one of the one or more design compliance scores; and the processor is further operable to: generate, in response to receiving the request from the user for the at least one of the one or more design compliance scores, the score response; and communicate the score response to the interface.

4. The apparatus of claim 1, wherein the processor is further operable to: identify, after the operation of the software change is permitted, an error associated with the operation of the software change; and associate the error with at least one of the following: a design compliance rule; and a building compliance rule.

5. The apparatus of claim 1, wherein: the interface is further operable to communicate a second request notification to the user, the second request notification indicating that additional building information is needed before operation of the software change is permitted; and the processor is further operable to: generate, in response to determining that operation of the software change is not permitted, the operate permit second request notification; and communicate the second request notification to the interface.

6. A computer readable storage medium comprising logic, the logic operable, when executed by a processor, to: receive design standards information comprising one or more design compliance rules for software development; store the design standards information; determine a design status of a software change according to design information received regarding the software change; calculate one or more design compliance scores, each design compliance score indicating an extent to which the design status complies with at least one of the one or more design compliance rules; determine whether to permit building of the software change based at least on the one or more design compliance scores; generate, in response to determining that building of the software change is not permitted, a first request notification, the first request notification indicating that additional design information is needed before building of the software change is permitted; communicate the first request notification to the user; generate, in response to determining to permit building of the software change, a build permit notification, the build permit notification indicating that building of a software change is permitted; communicate the build permit notification to a user, receive building standards information, the building standards information comprising one or more building compliance rules for the software development; store the building standards information; determine a building status of the software change according to building information received regarding the software change; calculate one or more building compliance scores, each building compliance score indicating an extent to which the information indicating the building status of the software change complies with at least one of the one or more building compliance rules; determine whether to permit operation of the software change based at least on the one or more building compliance scores; generate, in response to determining to permit operation of the software change, an operate permit notification, the operate permit notification indicating that operating of the software change is permitted; and communicate the operate permit notification to the user.

7. The computer readable storage medium of claim 6, wherein each design compliance rule comprises a rule type, the rule type indicating an impact of the design compliance score associated with each design compliance rule on the determination of whether to permit building of the software change.

8. The computer readable storage medium of claim 6, wherein the logic is further operable, when executed by the processor, to: receive a request from the user for at least one of the one or more design compliance scores; and generate, in response to receiving the request from the user for the at least one of the one or more design compliance scores, a score response, the score response comprising the at least one of the one or more design compliance scores; and communicate the score response to the user.

9. The computer readable storage medium of claim 6, wherein the logic is further operable, when executed by the processor, to: identify, after the operation of the software change is permitted, an error associated with the operation of the software change; and associate the error with at least one of the following: a design compliance rule; and a building compliance rule.

10. The computer readable storage medium of claim 6, wherein the logic is further operable, when executed by the processor, to: generate, in response to determining that operation of the software change is not permitted, a second request notification, the second request notification indicating that additional building information is needed before operating of the software change is permitted; and communicate the operate permit second request notification to the user.

11. A method for evaluating standards compliance during software development, comprising: receiving, by an interface, design standards information comprising one or more design compliance rules for software development; storing, by a memory, the design standards information; determining, by a processor, a design status of a software change according to design information received regarding the software change; calculating, by the processor, one or more design compliance scores, each design compliance score indicating an extent to which the design status complies with at least one of the one or more design compliance rules; determining, by the processor, whether to permit building of the software change based at least on the one or more design compliance scores; generating, by the processor, in response to determining that building of the software change is not permitted, a request notification, the request notification indicating that additional design information is needed before building of the software change is permitted; communicating, by the processor, the request notification to the interface; communicating, by the interface, the request notification to the user; generating, by the processor, in response to determining to permit building of the software change, a build permit notification, the build permit notification indicating that building of a software change is permitted; communicating, by the processor, the build permit notification to the interface; communicating, by the interface, the build permit notification to a user; receiving, by the interface, building standards information, the building standards information comprising one or more building compliance rules for the software development; storing, by the memory, the building standards information; determining, by the processor, a building status of the software change according to building information received regarding the software change; calculating, by the processor, one or more building compliance scores, each building compliance score indicating an extent to which the information indicating the building status of the software change complies with at least one of the one or more building compliance rules; determining, by the processor, whether to permit operation of the software change based at least on the one or more building compliance scores; generating, by the processor, in response to determining to permit operation of the software change, an operate permit notification, the operate permit notification indicating that operating of the software change is permitted; communicating, by the processor, the operate permit notification to the interface; and communicating, by the interface, the operate permit notification to the user.

12. The method of claim 11, wherein each design compliance rule comprises a rule type, the rule type indicating an impact of the design compliance score associated with each design compliance rule on the determination of whether to permit building of the software change.

13. The method of claim 11, further comprising: receiving, by the interface, a request from the user for at least one of the one or more design compliance scores; and generating, by the processor, in response to receiving the request from the user for the at least one of the one or more design compliance scores, the score response; communicating, by the processor, the score response to the interface; and communicating, by the interface, a score response to the user, the score response comprising the at least one of the one or more design compliance scores.

14. The method of claim 11, further comprising: identifying, by the processor, after the operation of the software change is permitted, an error associated with the operation of the software change; and associating, by the processor, the error with at least one of the following: a design compliance rule; and a building compliance rule.

* * * * *